Dec. 17, 1963   S. C. SENN   3,114,821
ELECTRICALLY HEATED SOLDERING PLIER
Filed Jan. 10, 1961
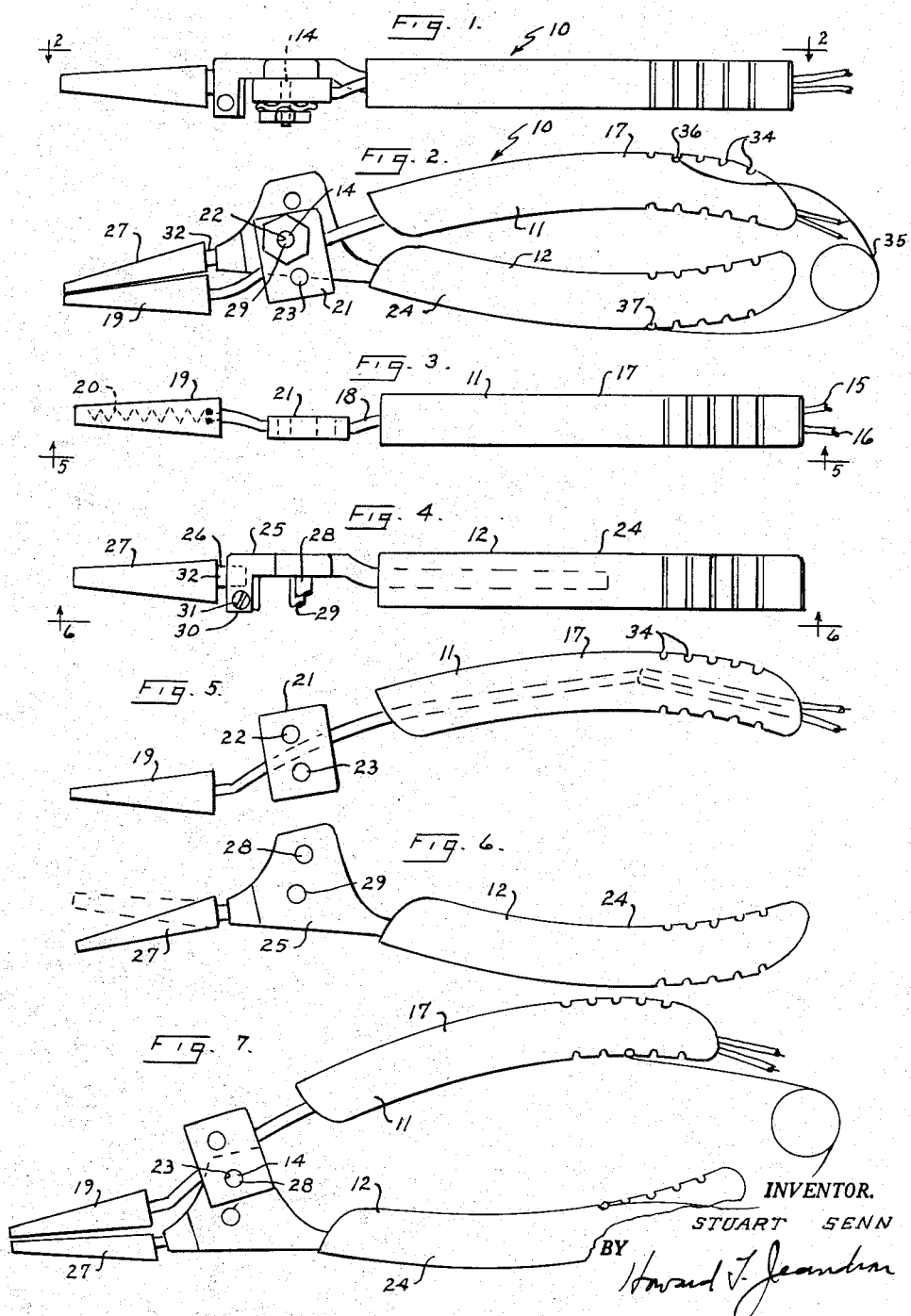
INVENTOR.
STUART SENN
BY
Howard J. Jeandron
AGENT United States Patent Office 3,114,821
Patented Dec. 17, 1963

3,114,821
ELECTRICALLY HEATED SOLDERING PLIER
Stuart C. Senn, 92 Main St., Keyport, N.J.
Filed Jan. 10, 1961, Ser. No. 81,844
2 Claims. (Cl. 219—26)

This invention relates to a soldering tool and more particularly a soldering tool in the form of a pair of pliers in which one leg of the pliers is the soldering iron and in which the other leg of the pliers is insulated and provided with a conducting tip.

The prior art illustrates various attempts at providing electrically heated soldering apparatus. However in the past the mechanic has utilized a soldering iron, a length of solder and a pair of pliers or clamp instead to perform a simple soldering operation. To facilitate in performing a soldering operation there are various soldering devices such as Patent No. 1,869,448 in which the soldering instrument is a pair of levers and in which the electrical current must pass through each leg or lever to create the heat for soldering at the working end. It is also to be noted that the points are carbon electrodes having very small physical strength.

It is an object of this invention to provide an electrically heated soldering plier in which one leg of the plier is a complete soldering iron and the opposite leg is insulated and provided with a heat conducting tip.

A further object of this invention is to provide an electrically heated soldering plier in which one leg of the plier is a complete soldering iron and the opposite leg is insulated and in which the tips of the plier are removable and reversible.

A still further object of this invention is to provide an electrically heated soldering plier in which one leg of the plier is a complete soldering iron and the opposite leg is insulated and in which means are provided to retain the soldering pliers in an adjusted gripping position.

Various other objects of this invention shall be apparent by reference to the accompanying detailed description and the drawings in which FIG. 1 is a top view of a pair of pliers, FIG. 2 is a view taken on line 2—2 of FIG. 1, FIG. 3 is a top view of the soldering iron half of the plier, FIG. 4 is a top view of the insulated half of the plier, FIG. 5 is a view taken on line 5—5 of FIG. 3, FIG. 6 is a view taken on line 6—6 of FIG. 4, and FIG. 7 illustrates a still further embodiment of this device.

This tool is designed primarily to enable the mechanic to perform soldering operations or the removal and unsoldering of various components especially in crowded or small positions where it is practically impossible to provide a soldering iron the solder and a clamp or plier for holding. With the device as illustrated in a soldering operation the exceptionally small tips may be readily positioned about the object to be soldered and with one leg of the plier functioning as a soldering iron the tip may be heated either before grasping the article or while the article is being held to provide the necessary heat for soldering, thus the mechanic may readily feed the necessary solder with the other hand. In the further use of the tool in which a soldered joint is to be opened or a soldered device removed, it is only necessary to use one hand simply grasping the particular joint or article with the tips of the plier and the heat from the soldering iron will soon provide the necessary melting of the soldered joint and allow the removal of the joint or soldered article as desired. In carrying out this invention there is provided a pair of pliers 10 comprised of two legs 11 and 12 joined at a fulcrum point 14. The leg 11 is in fact a complete soldering iron as illustrated in FIGS. 3 and 5 in which the electrical wires 15 and 16 are brought through a handle 17 of the leg 11, the handle 17 being mounted on a tubular element 18 and the wires passing through tubular element 18 to the tip 19, the tip 19 being in fact the soldering iron enclosing the heating resistance 20. A central portion of leg 11 is provided with an enlarged portion 21, FIG. 5, portion 21 is provided with two apertures 22 and 23. Aperture 22 as shown in FIG. 2 is utilized to join leg 11 to leg 12. Referring to FIGS. 4 and 6 the opposite leg 12 of the plier is illustrated. Leg 12 is similarly provided with a handle portion 24 which is mounted on the extended insulated leg portion 25. Portion 25 is provided at its end with a square shaped aperture 26 to permit mounting a tip 27. The portion 25 is also provided with a pair of right angularly positioned pivot posts 28 and 29. It is to be noted that the end of portion 25 although provided with an aperture 26 is actually a split end 30 with a clamp screw 31. Thus when a shank 32 of the tip 27 is inserted in the aperture 26 the set screw 31 may be utilized to grasp the shank 32 tightly and prevent its removal. It is to be noted that when leg 12 of the plier 10 is combined with leg 11, as in FIG. 2, it is the pivot 29 that is utilized. In this joined position illustrated in FIG. 2 to insure the two legs remaining in the aligned position as illustrated in FIG. 1, a washer and nut may be provided on the end of pivot 29. Thus as illustrated in FIG. 1 with the pressure washer abutting the face of portion 21 the nut may be threaded onto pivot 29 until it retains the two legs 11 and 12 in a tight abutting position. However the pressure washer as designed allows the movement of the plier without affecting the position of the retaining nut. Referring to FIGS. 5 and 6 it is to be noted that there are a plurality of notches 34 in both handles and referring to FIG. 2 there is illustrated a coil spring 35 with two ends 36 and 37, the end 36 formed to fit into the notches 34 of the handle 17 while the end 37 is similarly formed to fit into the notches 34 of handle 24. The spring 35 may be a double spring, that is to say a coil on each side of the handles. Thus in this form the spring is guided and held in place by the sides of the handles. The spring 35 will retain a squeeze on the handles similar to a light hand pressure. The spring is designed so that the degree of squeeze may be increased or decreased by moving the ends 36 and 37 into the various notches. The least pressure will be with the ends moved inward on the handle; the greater pressure will be with the ends of the spring moved as far out on the handle as permissible. A further application of spring 35 is to position the ends 36 and 37 on the interior surface of the handles to provide a resistance to the normal hand pressure. This gives a much more delicate precision in the handling of the tool and of course a harder feel in closing the jaws of the plier; at times this is desirable. Referring to the tip 27 this is designed to be removable and of course may be designed to any size or shape desired for the various soldering operations, the face of tip 27 may have a configuration to fit a nut or a washer, etc. It is also to be understood that although the tip 19 of the soldering iron leg is shown of a particular configuration it may be similarly shaped in size and form to mate with tip 27. It may be a sharp pointed tip for extremely small soldering operations or it may be flat or curved as desired.

Although the tool has been described primarily as a soldering plier it is apparent that the two legs 11 and 12 may be separated by simply removing portion 25 from portion 21 slipping the portion 21 off the pivot 29. Thus as a separate element leg 11 may be used alone as a soldering iron.

A further application of this tool is to rejoin the two legs 11 and 12 but in this instance pivot 28 is utilized and the aperture 23. In addition the tip 22 is removed from portion 25 and turned so that its opposite face will abut with the soldering tip 19. In this position the tool becomes a clamp and the spring 35 instead of being mounted on the exterior surface of the handles 17 and 24, it is positioned so that its ends 36 and 37 abut with the interior faces of the handles 17 and 24 and spring 35 in this instance will exert an outward separation of handles 17 and 24.

Although the soldering pliers have been illustrated in a particular configuration the handle configuration may be changed that is to provide a longer or shorter handle, a flatter or rounder type handle without departing from the spirit of this invention. Likewise although a particular type of tip has been shown the soldering tip may be changed to any size or configuration without departing from the spirit of this invention and although the soldering tip has been shown in the upper leg of the plier it may be reversed and constructed to fit the lower leg and be removable as illustrated in the lower leg without departing from the spirit of this invention and although the tool is primarily a soldering plier it may also be a soldering clamp without departing from the spirit of this invention and this invention shall be limited only by the appended claims.

What is claimed is:

1. A plier comprising a pair of legs having handles at one end and abutting mating tips at the opposite end, said legs adapted to be pivotally joined together in either of two gripping combinations, each tip having a pair of longitudinally extending opposed working faces, the tip on one of said legs being removable and reversible to utilize either one of said pair of working faces, each leg provided with a fulcrum portion intermediate its ends, one fulcrum portion having a pair of spaced apertures, the other fulcrum portion having a pair of spaced pivot posts, each pivot post singularly fitting pivotally in either aperture, and in which one pivot posts on one leg and one aperture on the other leg are used to pivotally join the legs together to provide a plier in which the handles are moved toward each other for one workable gripping combination, and the other pivot post and the other aperture with said one tip reversed are used to pivotally join the legs together to provide a plier in which the handles are moved away from each other for another workable gripping combination, and a torsion spring for applying a selective biasing force to said handles, said spring biasing said handles together in said first position and biasing said handles apart in said second position.

2. In a device according to claim 1 in which one of said tips is provided with an electrically heated element and the other tip is constructed of a heat conductive material to be heated by contact with said heated tip.

References Cited in the file of this patent

UNITED STATES PATENTS

| | | |
|---|---|---|
| 1,422,826 | Brown | July 18, 1922 |
| 1,845,475 | Benson | Feb. 16, 1932 |
| 2,395,988 | Biles | Mar. 5, 1946 |
| 2,469,877 | Haberman | May 10, 1949 |
| 2,759,090 | Frye | Aug. 14, 1956 |
| 2,817,989 | Nowak | Dec. 31, 1957 |

FOREIGN PATENTS

| | | |
|---|---|---|
| 121,765 | Sweden | May 25, 1948 |
| 491,458 | Italy | May 5, 1954 |